(12) United States Patent
Palmer

(10) Patent No.: US 7,273,561 B1
(45) Date of Patent: Sep. 25, 2007

(54) METHOD FOR DETERMINING THE CHEMICAL DOSAGE REQUIRED TO REDUCE SULFIDES IN WASTEWATER TO ACCEPTABLE LEVELS

(75) Inventor: David G Palmer, Lincoln, NE (US)

(73) Assignee: Waitaki Research Corporation, Lincoln, NE (US)

( * ) Notice: Subject to any disclaimer, the term of this patent is extended or adjusted under 35 U.S.C. 154(b) by 300 days.

(21) Appl. No.: 10/968,434

(22) Filed: Oct. 19, 2004

Related U.S. Application Data

(60) Provisional application No. 60/568,437, filed on May 5, 2004, provisional application No. 60/535,058, filed on Jan. 8, 2004, provisional application No. 60/513,001, filed on Oct. 21, 2003.

(51) Int. Cl.
 *C02F 1/20* (2006.01)
(52) U.S. Cl. .............. 210/742; 73/19.1; 73/863.71; 210/709; 210/718; 210/743; 210/750; 210/916; 422/3; 422/5; 436/121; 436/177
(58) Field of Classification Search ............... 210/739
 See application file for complete search history.

(56) References Cited

U.S. PATENT DOCUMENTS

| | | | | | |
|---|---|---|---|---|---|
| 4,432,880 | A | * | 2/1984 | Talbot | 210/725 |
| 4,465,593 | A | * | 8/1984 | Wemhoff | 210/96.1 |
| 5,356,458 | A | * | 10/1994 | Javadi et al. | 95/13 |
| 5,981,289 | A | * | 11/1999 | Wright et al. | 436/121 |
| 6,939,717 | B2 | * | 9/2005 | Jiang et al. | 436/121 |
| 7,083,733 | B2 | * | 8/2006 | Freydina et al. | 210/739 |
| 7,138,049 | B2 | * | 11/2006 | Hunniford et al. | 210/143 |
| 7,186,341 | B2 | * | 3/2007 | Hunniford et al. | 210/610 |
| 2004/0232084 | A1 | * | 11/2004 | Matsunami et al. | 210/709 |

\* cited by examiner

*Primary Examiner*—Peter A. Hruskoci
(74) *Attorney, Agent, or Firm*—Van Dyke, Gardner, Linn & Burkhardt, LLP

(57) ABSTRACT

An apparatus and method of determining chemical dosage required to reduce sulfides in wastewater includes providing a headspace apart from the wastewater. The temperature of the wastewater and the concentration of sulfide gas in the headspace are measured. Dissolved hydrogen sulfide gas concentrations in the wastewater are calculated from the temperature of the wastewater and the concentration of sulfide gas in said headspace. When pH is monitored, dissolved sulfide concentrations can be calculated.

26 Claims, 6 Drawing Sheets

METHOD FOR DETERMINING THE CHEMICAL DOSAGE REQUIRED TO REDUCE SULFIDES IN WASTEWATER TO ACCEPTABLE LEVELS

CROSS REFERENCE TO RELATED APPLICATIONS

This application claims priority from U.S. provisional patent application Ser. No. 60/513,001, filed on Oct. 21, 2003; U.S. provisional patent application Ser. No. 60/535,058, filed on Jan. 8, 2004; and U.S. provisional patent application Ser. No. 60/568,437, filed on May 5, 2004, the disclosures of which are hereby incorporated herein by reference in their entirety.

BACKGROUND OF THE INVENTION

The present invention is directed to a method and apparatus for treating wastewater and, in particular, to a method and apparatus of measuring the chemical dosage required to reduce a gas, such as hydrogen sulfide in water.

Hydrogen sulfide gas ($H_2S$) has an obnoxious odor often referred to as the smell of "rotten eggs". It is toxic at relatively low concentrations and also extremely corrosive as it forms an acidic solution when dissolved in water. These characteristics make hydrogen sulfide a major problem for many wastewater collection and treatment facilities where costly chemicals must be dosed in order to combat its effects.

Hydrogen sulfide gas is a product of natural biological processes that occur when the dissolved oxygen levels in wastewater containing organic matter is depleted by oxygen consuming bacteria. Certain species of bacteria have the ability to meet their oxygen requirement by stripping oxygen from inorganic ions present in the water. When the stream contains sulfate ($SO_4^{2-}$) or sulfite ($SO_3^{2-}$) ions, this results in the release of sulfide ($S^{2-}$) ions into the stream.

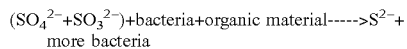
more bacteria

Equilibrium is established between dissolved hydrogen sulfide gas ($H_2S$), bisulfide ions ($HS^-$), and sulfide ions ($S^{2-}$) that are dependent upon pH.

These three forms of sulfides make up the "Dissolved Sulfides" in the waste stream. The dissolved hydrogen sulfide gas escapes through the liquid/air interface into the air. The rate per unit area of exposed surface at which it escapes depends upon temperature and the concentration gradient across the air/water interface; i.e., the difference between the concentrations of dissolved $H_2S$ gas in the water and the concentration in the air. The concentration of dissolved hydrogen sulfide gas in wastewater determines the concentration of hydrogen sulfide gas immediately above the water surface. How this is detected as odor depends upon the air movement above the water surface, and the actual surface area. The latter depends not only on geometry but is also influenced by agitation caused by wind and mechanical actions.

Various approaches have been developed in order to reduce or eliminate hydrogen sulfide gas from collections systems, pump stations, and wastewater treatment plants. A common approach is to dose chemicals, which either eliminate the formation of sulfides, eliminate dissolved sulfides once they have been produced, or do both. Often iron salts (ferric chloride, ferrous chloride, ferrous sulfate) are added to the waste stream resulting in the precipitation of insoluble ferrous sulfide. Such bound sulfides play no further role in odor release. Bioxide, a proprietary form of calcium nitrate, inhibits the formation of sulfides by offering the bacteria an alternative source of oxygen. They prefer stripping oxygen from nitrate ions over stripping oxygen from sulfate or sulfide ions. Bioxide also has been shown to reduce dissolved sulfides already present in the stream.

The most common approach by wastewater treatment plant operators is to take grab samples and measure total or dissolved sulfides, such as by using a test kit of the type marketed by LaMotte or Hach. Using the result obtained, they adjust the rate of chemical feed based upon historical experience. Grab samples may be taken once per day or at less frequent intervals. Operators develop a sense as to when higher dosage levels may be required. A common operating procedure is to add chemicals by two fixed rate pumps. One will be run continuously while the second is turned on and off, either manually or by using a timer, to coincide with times perceived to require higher dosing rates.

This approach often results in overdosing—costly because of higher usage than necessary—and under-dosing—costly because of odor complaints and infrastructure damage. The conditions that influence sulfide formation change from hour-to-hour as well as day-to-day; hence, real-time monitoring is highly desirable.

Another approach is a total sulfides analyzer which acidifies the sample in order to convert all dissolved sulfides present into dissolved $H_2S$ gas. This is then sparged from the system using air and the concentration of $H_2S$ gas in the airstream is measured by a gas phase sensor. The process of acidification releases sulfide ions from "bound" sulfides—sulfides that exist within the stream in particulate form—not in ionic form. These do not contribute to odor and should not be considered when assessing the potential of a waste stream to produce odor. Total sulfides is not the best parameter for the efficient dosing of odor chemicals as, in many instances, it will overestimate the potential of the stream to release $H_2S$.

In another approach, the sample is not acidified. The monitor calculates a new parameter—"purgeable sulfides". The relationship between this parameter and dissolved sulfides has not been established.

SUMMARY OF THE INVENTION

In order to dose chemicals in an efficient and economical way, a reliable and simple method is required which, in real time, can match the chemical addition rate to the dissolved sulfide level in the waste stream. The present invention targets the level of dissolved hydrogen sulfide gas in treated wastewater for controlling the addition of odor-reducing chemicals. The current invention describes a method which allows dissolved sulfides to be monitored in a simple and reliable fashion and the information used to add chemicals in a cost effective manner.

A method and apparatus for determining chemical dosage required to reduce sulfide concentration in wastewater includes providing a headspace apart from the wastewater and measuring concentration of sulfide gas in the headspace. Dissolved hydrogen sulfide concentration is calculated in the wastewater as a function of the concentration of sulfide gas in the headspace.

A method and apparatus for determining chemical dosage required to reduce sulfide concentration in wastewater, according to another aspect of the invention, includes providing a substantially sealable vessel, the vessel defining a sample space to hold a sample of wastewater in a headspace apart from the sample space. Concentration of sulfide gas in the headspace is measured. pH of the wastewater is sensed. Dissolved sulfide concentration in the wastewater is calculated as a function of the concentration of sulfide gas in the headspace and the pH of the wastewater.

A method and apparatus for determining chemical dosage required to reduce sulfide concentration in wastewater, according to another aspect of the invention, includes providing a substantially sealable vessel, the sealable vessel defining a sample space to hold a sample of wastewater in a headspace apart from the sample space. Concentration of sulfide gas in the headspace is measured. A dispenser is provided. The dispenser dispenses a chemical additive that reduces sulfide in the wastewater. The dispenser is controlled to dispense an amount of chemical additive in the wastewater as a function of concentration of sulfide gas in the headspace.

According to an embodiment of the invention, a batch system for determining dissolved sulfides in a waste stream involves isolating a measured sample in a sealed enclosure with a known headspace and using mechanical agitation to rapidly achieve equilibrium between the hydrogen sulfide gas dissolved in the sample and that released into the headspace. The equilibrium concentration in the headspace is measured along with the temperature. From this information, the concentration of dissolved hydrogen sulfide gas in the stream can be calculated. This is the primary indicator of the potential of a wastewater stream to outgas hydrogen sulfide.

Equilibrium may be accelerated by using a high-speed mixer or similar device to increase the air/water contact surface. Alternatively, air can be drawn from the headspace using a suitable pump and bubbled through the sample to achieve equilibrium. In this case, a diffuser might be used on the entrance of the re-circulated air/gas mixture to maximize surface contact between the air/gas mixture and the sample. The concentration of $H_2S$ gas may be measured in the air space using a gas sensor, such as an Odolog Gas Data Logger made by App-Tek International Pty of Brendale, Queensland, Australia.

In another embodiment of the invention, a pH probe is included in the reactor to allow the pH of the sample to be established before, during, and after treatment. A temperature sensor is included in the reactor to allow for the dependence of Henry's constant on temperature. The current embodiment measures the concentration of hydrogen sulfide gas in a sealed space above a wastewater sample once equilibrium has been established.

Henry's Law teaches that, at equilibrium, the concentration of a gas in solution is directly proportional to the partial pressure of the gas in the air in contact with the solution. As illustrated in FIG. 2, the constant of proportionality is dependent upon both the gas itself and temperature. By knowing Henry's constant at the sample temperature, the gas concentration in the headspace can be used to calculate the concentration of dissolved $H_2S$ gas in the original sample. Knowledge of the relative volumes of headspace to sample and the pH then allows calculation of the dissolved sulfide using established relationships.

It is believed that oxygen in the air in the headspace oxidizes dissolved $H_2S$ gas in the sample during agitation. Because of equilibrium between dissolved $H_2S$ and the $H_2S$ in the headspace, the overall effect is to reduce the concentration in the air. Hence, agitation should be limited to that necessary to achieve equilibrium. If the sample continues to be agitated, the dissolved sulfides present in the sample may be appreciably reduced.

In one embodiment of the invention, to avoid such oxidation, the headspace can be filled with nitrogen gas rather than air.

The reactor may include a dispensing system to permit the accurate addition of chemicals to the reactor which reduce the potential of the sample to release $H_2S$ gas into the air. After the initial measurement has been taken, a pre-set quantity of such chemical is added. Mixing is initiated and, once equilibrium has been again established, the reduced concentration of hydrogen sulfide gas in the headspace is noted. A further addition of a chemical is made, and the decrease in hydrogen sulfide in the headspace recorded. The magnitude of each chemical addition can be chosen to provide a dosing curve, which can be interpolated to provide the chemical addition necessary to reduce $H_2S$ emission to an acceptable low level or eliminate it completely. This procedure can also be used to compare the relative merits of different chemicals on a given waste stream.

Total sulfides (dissolved sulfides+bound sulfides) are often used in writing permits for industrial dischargers. The equipment and technique can be used for measuring total sulfides by using the chemical dispensing system to add acid which coverts bound sulfides into dissolved sulfides.

Because the potential of a waste stream to outgas hydrogen sulfide gas depends proportionally upon the concentration of dissolved hydrogen sulfide gas in the stream, a target level of dissolved hydrogen sulfide gas in a treated stream is utilized in embodiments of the present invention as the parameter for efficient chemical dosing. This can be accomplished by using an on-line sensor monitoring the treated stream and using the signal in a closed loop to control the dosing of chemicals upstream of the monitor.

According to another embodiment of the invention, an on-line process includes a device for continuously monitoring dissolved hydrogen sulfide gas. A pumping device, such as a peristaltic pump, continuously draws a sample from a waste stream through a coarse filter and directs it to a well inside a sealed reaction chamber. Overflow from the well is returned to the stream through a trap. A second higher volume pump draws liquid from the well and forces it through nozzles in the headspace above the well. The liquid is discharged in the form of many jets which impinge on the reaction chamber's internal walls. A pressure equalizer ensures that the headspace remains at atmospheric pressure. The pressure equalizer can consist of small bore tubing with a length much greater than its internal diameter. While pressure is equalized, the reactor vessel remains effectively sealed. An air/gas pumping device continuously draws air containing hydrogen sulfide gas from the headspace inside the reaction chamber through a closed loop and returns it to the reaction chamber. This insures that heavier than air hydrogen sulfide gas remains intimately mixed with the air occupying the reaction vessel. The hydrogen gas sensor can be mounted in the recirculation loop or in a secondary loop.

These and other objects, advantages and features of this invention will become apparent upon review of the following specification in conjunction with the drawings.

DETAILED DESCRIPTION OF THE PREFERRED EMBODIMENT

I) Batch System.

Description of the Apparatus.

Figure 1:
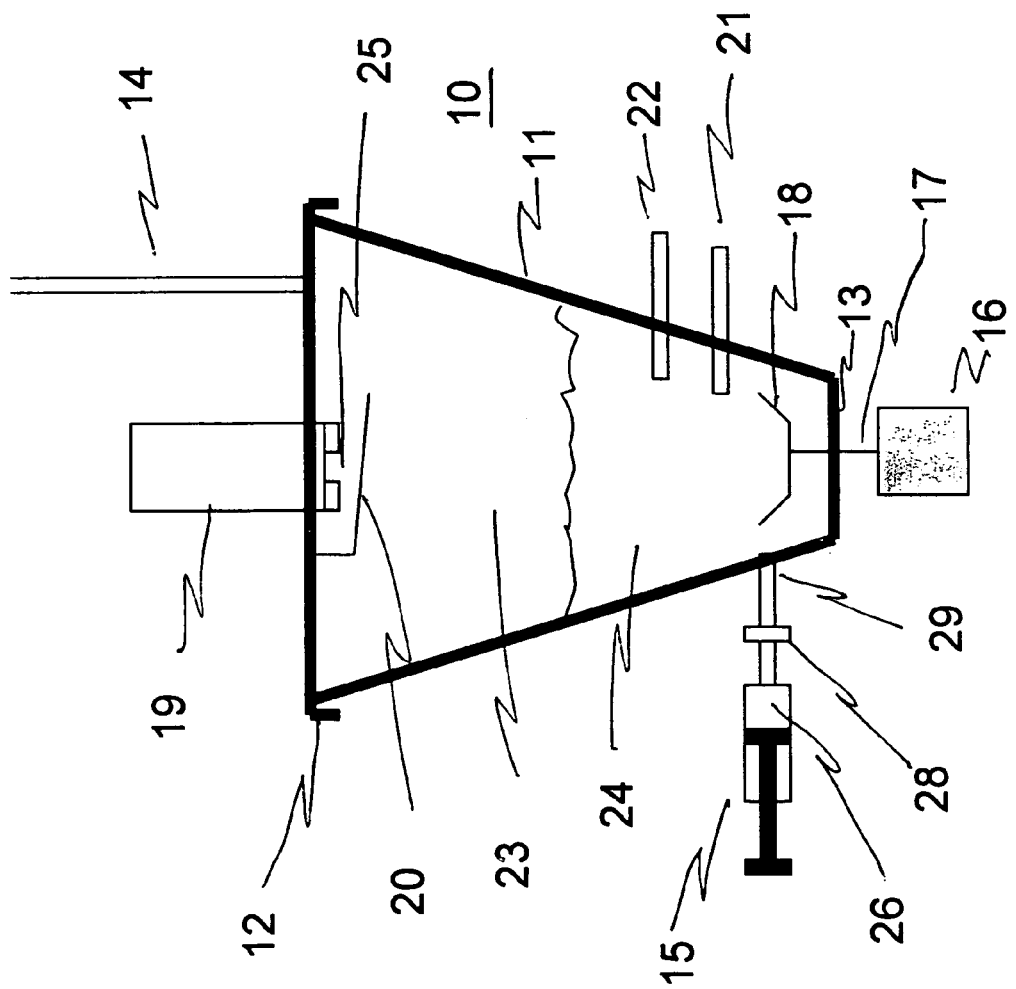
FIG. 1 is a schematic diagram of an apparatus for determining the chemical dosage required to reduce sulfides in wastewater.
Figure 2:
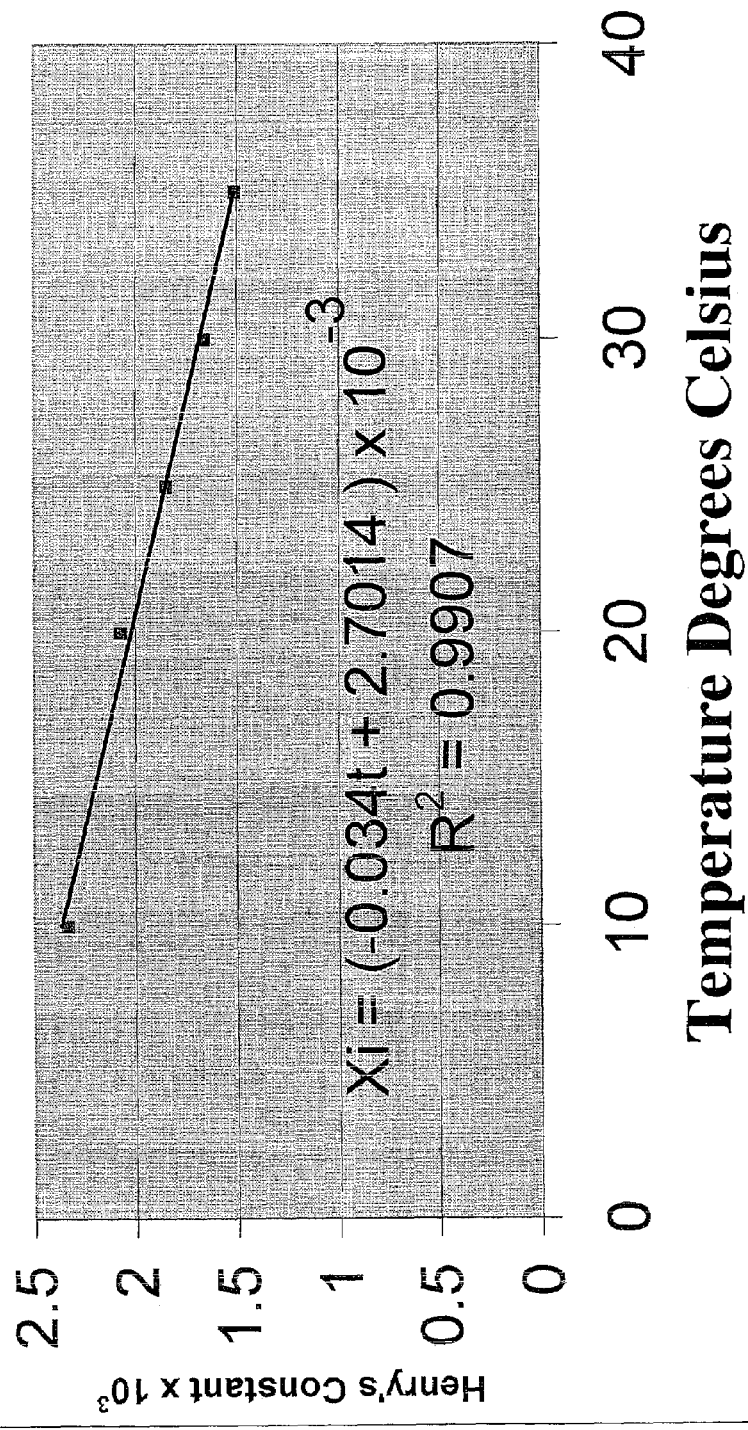
FIG. 2 is a diagram of Henry's constant as a function of temperature.

Referring to FIG. 1, a batch system 10 for determining dissolved sulfides in a waste stream includes a removable lid 12 that makes a gas tight seal when secured onto a reaction vessel 11. A gaseous hydrogen sulfide sensor 19 senses the interior of vessel 11. In the illustrated embodiment, sensor 19 is mounted to lid 12 and has a sensing opening 25 that is protected against splashing by splash shield 20. A stirring device consisting of a motor 16, a shaft 17 and an impeller 18 is provided and may be mounted centrally through the base 13. A vent tube 14 vents vessel 11 such as through the lid 12. A port 29 with a coupling 28 contains a non-return valve to which a chemical addition device 15 can be connected for adding accurate volumes of chemical 26, such as through a non-return valve 28 to a port 29 of vessel 11.

The reaction vessel 11 has a temperature sensor 21 and an optional pH sensor 22 mounted so as to be immersed in the wastewater sample 24. The reaction vessel 11 contains both the sample space 24 and a headspace 23 above sample space 24.

Description of the Procedure.

Mode 1.

A fixed volume of sample 24 is added to the reaction vessel 11 and the removable lid 12 is secured and the vessel sealed. The values being measured by temperature sensor 21 and pH sensor 22 are noted. The mixer motor 16 is energized and the impeller 18 causes strong mixing of the air contained in the headspace 23 and the liquid sample 24 with the release of hydrogen sulfide gas from the sample 24 into the air within the headspace 23. This speeds up the objective of attaining equilibrium between the hydrogen sulfide gas dissolved in the sample 24 and the concentration in the headspace 23. Values for the concentration of hydrogen sulfide gas in the headspace 23 are displayed by the gaseous hydrogen sulfide sensor 19 and, when the value becomes stable, stirrer motor 16 is de-energized and the values from temperature sensor 21 and pH sensor 22 recorded.

Lid 12 is removed and sample 24 is emptied out and the inside of the reaction vessel 11 rinsed out before the process is repeated.

From the values recorded, the concentration of dissolved hydrogen sulfide gas and dissolved sulfides in the original sample can be calculated.

Mode 2.

In a second mode of operation of batch system 10, if total sulfide is the parameter required, chemical addition device 15 can be used to add acid in a controlled fashion to bring the sample pH down to 2.0 or less where all of the sulfides present in sample 24 will be in the form of dissolved hydrogen sulfide gas. Total sulfide is a parameter often used for permitting industrial dischargers.

Mode 3.

In a third mode of operation of batch system 10, a fixed volume of sample 24 is added to the reaction vessel 11 and the removable lid 12 is secured. The mixer motor 16 is energized and the impeller 18 causes strong mixing of the air contained in the headspace 23 and the liquid sample 24 with the release of hydrogen sulfide gas from the sample 24 into the air within the headspace 23. This speeds up the objective of attaining equilibrium between the hydrogen sulfide gas dissolved in the sample 24 and the concentration in the headspace 23. Values for the concentration of hydrogen sulfide gas in the headspace 23 are displayed by the gaseous hydrogen sulfide sensor 19. When the value becomes stable, a predetermined volume of sulfide-reducing chemical is added from chemical addition device 15, which reduces the level of dissolved sulfide in sample 24. The concentration of hydrogen sulfide gas in the headspace now falls until equilibrium is again established between the hydrogen sulfide gas in the headspace 23 and the dissolved hydrogen sulfide gas in the sample 24. The concentration shown by the gaseous hydrogen sulfide sensor 19 is noted. The procedure is repeated. The quantity of chemical added each time should be chosen to allow a minimum of four chemical additions to be made before the hydrogen sulfide readings become zero. Motor 16 is de-energized. The plot of hydrogen sulfide concentration as measured by hydrogen sulfide sensor 19 versus cumulative chemical addition can be extrapolated to provide the chemical addition needed to achieve a targeted hydrogen sulfide concentration.

Lid 12 is then removed. Sample 24 is emptied out and the inside of the reaction vessel 11 is rinsed out before the process is repeated.

Theoretical Considerations.

As best understood, the present invention is based generally upon the following physical principles. However, other reactions may contribute to the results.

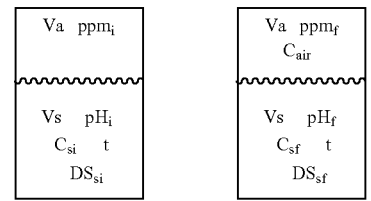

Let

Va be the volume of the headspace in liters

Vs be the volume of the sample in liters

R=Va/Vs $ppm_i$ be the initial concentration of $H_2S$ gas in the headspace in ppm.

$ppm_f$ be the final concentration of $H_2S$ gas in the headspace in ppm.

$C_{air}$ be the final concentration of $H_2S$ gas in the headspace in mg/L $C_{si}$ be the initial concentration of $H_2S$ gas in the sample in mg/L $C_{sf}$ be the final concentration of H$_2$S gas in the sample in mg/L $DS_i$ be the initial concentration of dissolved sulfides in mg/L $DS_f$ be the final concentration of dissolved sulfides in mg/L t be the sample temperature in degrees Centigrade Procedure.

Measure and record. ppm$_f$

Calculate partial pressure in atmospheres=ppm$_f \times 0.847 \times 10^{-6}$

Calculate Xi for the observed temperature using Xi=(−0.034t+2.7014)×10$^{-3}$

Calculate $C_{sf}$ in mole H$_2$S/mole water=Xi×partial pressure

Calculate $C_{sf}$ in mg/L=10$^3 \times C_{sf}$ (mole H$_2$S/mole water)×34/18

Calculate $DS_{sf}$ in mg/L=$C_{sf}$/b where b=10$^{(7-pH)}$/(1+$_{10}^{(7-pH)}$)

Calculate $DS_i$ in mg/L=$DS_{sf}$+R.ppm$_f$· (28.8×273)/(22400×(273+t)). 10$^{-3}$ Verification.

Figure 3:
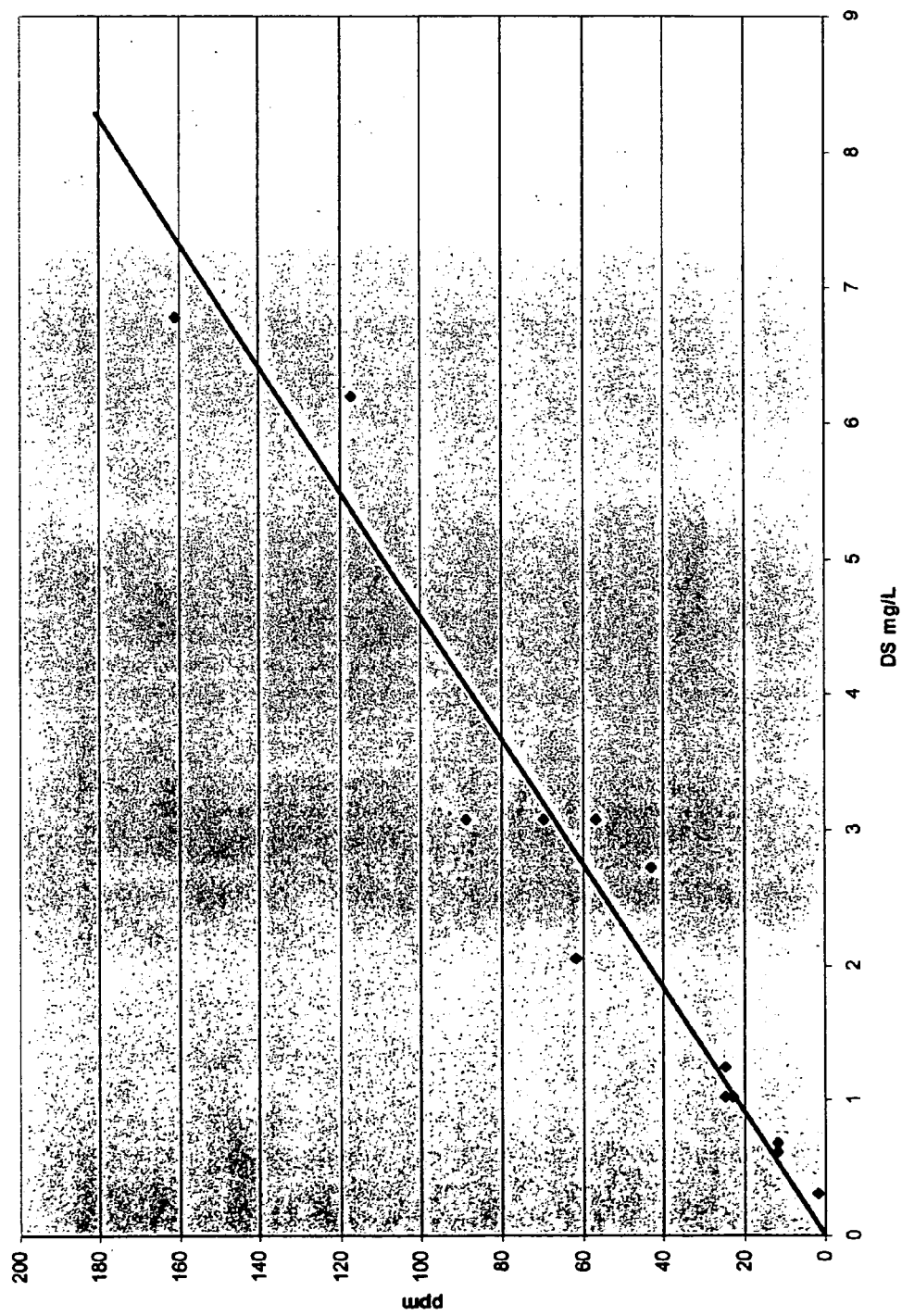
FIG. 3 is a graph of ppm of hydrogen sulfide in the headspace of the apparatus in FIG. 1 obtained using solutions with known concentrations of sodium sulfide in tap water.

Solutions containing known amounts of sodium sulfide in tap water were tested according to the procedures described in Mode 1. The results are contained in FIG. 3. A strong linear relationship is evident between the ppm in the headspace at equilibrium and the concentration of dissolved sulfides in solution. The pH of the samples rose by less than 0.1 pH units as a consequence of the testing.

II) On-Line Dissolved Hydrogen Sulfide Monitor.

Figure 4:
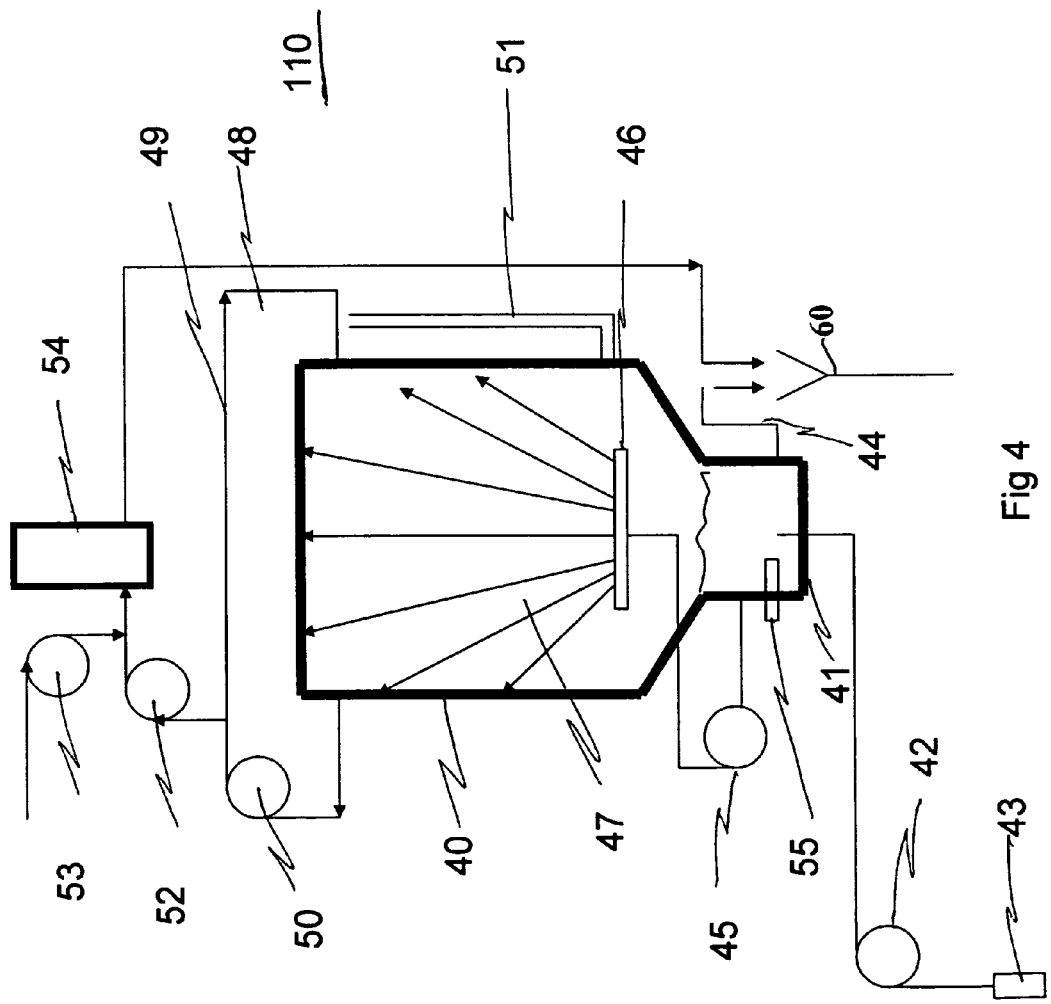
FIG. 4 is a schematic diagram of an on-line apparatus.

A system 110 for continuously monitoring dissolved hydrogen sulfide is shown in FIG. 4. A reactor chamber 40 is sealed to a well 41 which contains a fixed volume of sample. Sample pump 42 continuously draws sample through filter screen 43 and delivers it to well 41. Excess sample overflows through trap 44 and is returned to the wastewater stream at 60. The temperature of the sample in well 41 is monitored by temperature sensor 55. High volume circulating pump 45 draws from well 41 and directs the sample to a distributor arm 46. The sample is sprayed inside reaction chamber 40 through nozzles in distributor arm 46 and impinges upon the internal surface of reactor chamber 40. Distributor arm 46 is caused to rotate due to the velocity with which the sample is ejected from the nozzles. This results in intimate mixing of the sample from well 41 and air in sealed headspace 47 resulting in rapid equilibrium being established between dissolved hydrogen sulfide gas in the sample contained in well 41 and that in the sealed headspace 47. Distributor arm 46 and circulating pump 45 may be configured to operate in a similar fashion to a domestic dishwasher. Alternatively, a simple system with fixed nozzles may be used.

A pressure-equalizing device 51 may be provided to cause the headspace to remain at atmospheric pressure. Pressure equalizing device 51, in the illustrative embodiment, consists of small bore tubing with a length much greater than its internal diameter. While pressure is equalized, the reactor vessel remains effectively sealed. A circulating loop 48, such as consisting of flexible tubing 49 and an air pump 50, draws headspace gas and returns it to the reactor chamber. Circulation loop 48 is designed to keep intimate mixing between hydrogen sulfide gas and air in the sealed headspace 47. Gas sampling pump 52 and air purge pump 53 alternate to flow either air or headspace gases past the hydrogen sulfide gas sensor 54. In the illustrative embodiments, they are peristaltic pumps which act as shut off valves when they are not pumping. The air/gas mixture from hydrogen sulfide gas sensor 54 is returned to the waste stream. Air purge pump 53 and gas sampling pump 52 pump lower volumes than does air pump 50.

Operation.

The monitor 110 is positioned adjacent to the stream, and sample pump 42 is energized. When well 41 starts to overflow, high volume circulating pump 47, air pump 50, and gas sampling pump 52, are energized. Hydrogen sulfide gas concentrations and temperature data is recorded. Initially, air in the headspace will contain oxygen. This may react with the dissolved sulfides and be consumed; however, after a suitable period the headspace will contain essentially no oxygen which interferes with the measurement. Because of the continual introduction of a sample into the reactor, the pH of the sample in contact with the gas in the headspace will quickly approach the pH of the stream. Hence, the dissolved hydrogen sulfide concentration in the stream becomes equal to the dissolved hydrogen sulfide concentration in the reactor. This can be calculated directly from the data being recorded.

Maintaining the H$_2$S Detector.

Detectors that use chemical sensors are limited by the time they can be exposed to 100% humidity. Also, they should be intermittently exposed to oxygen in order to continue to operate correctly. At predetermined intervals, gas sampling pump 52 is de-energized and air purge pump 52 energized. Normal air flows past hydrogen sulfide gas sensor 54 reducing the humidity in contact with the sensor element while providing sufficient oxygen to condition the sensor element.

Such an arrangement provides substantially continuous monitoring of the stream for dissolved hydrogen sulfide while protecting the chemical sensor from becoming damaged by the high humidity and lack of oxygen.

Controlling Chemical Dosing Using an On-line Monitor.

The signal from an on-line monitor can be used in either a closed (feed-back) control loop or an open (feed-forward) control loop to control chemical dosing in order to achieve a target level of dissolved hydrogen sulfide gas in the treated stream.

Figure 5:
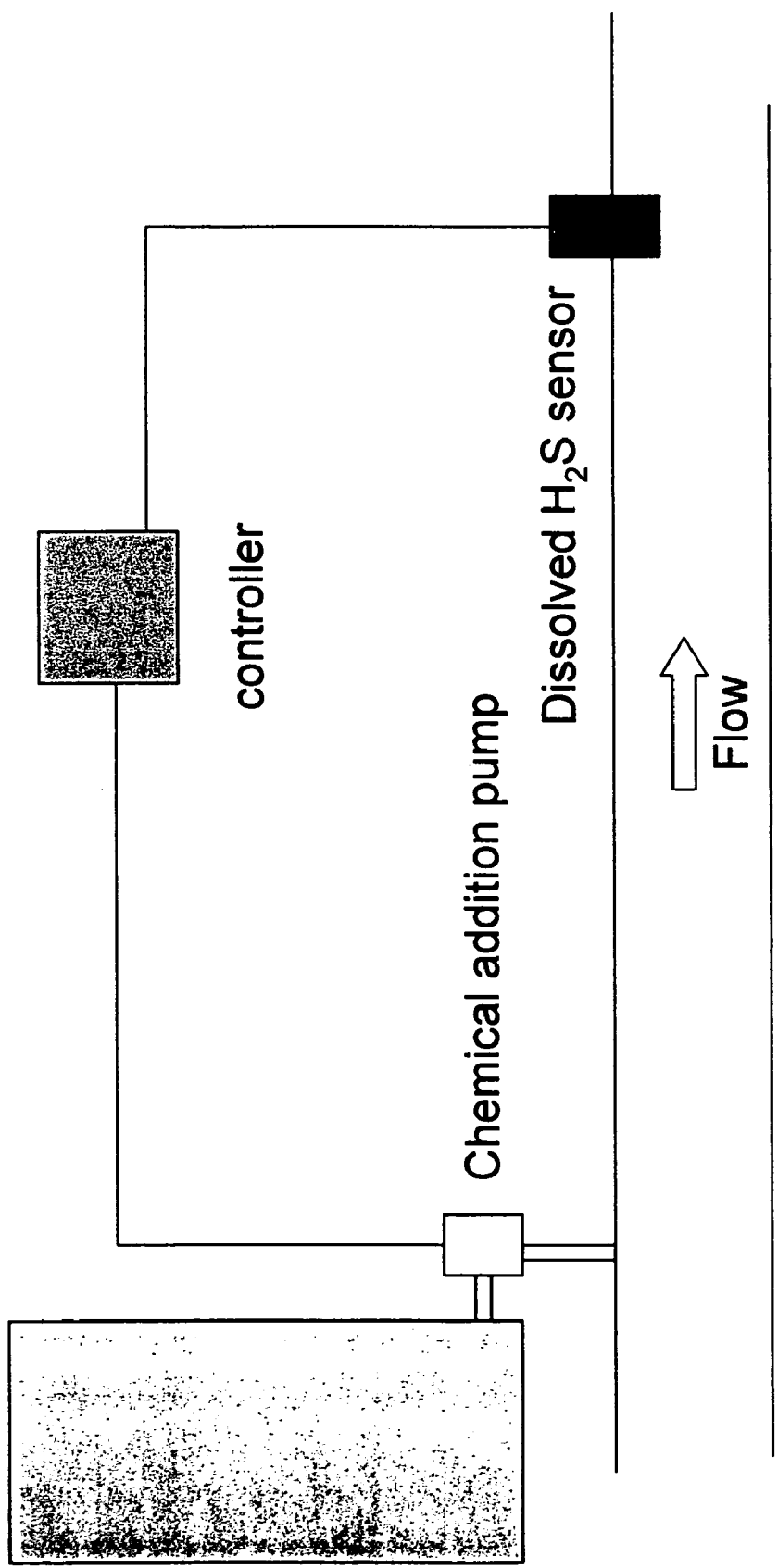
FIG. 5 is a schematic diagram of an on-line apparatus being used in a closed loop to control chemical addition.
Figure 6:
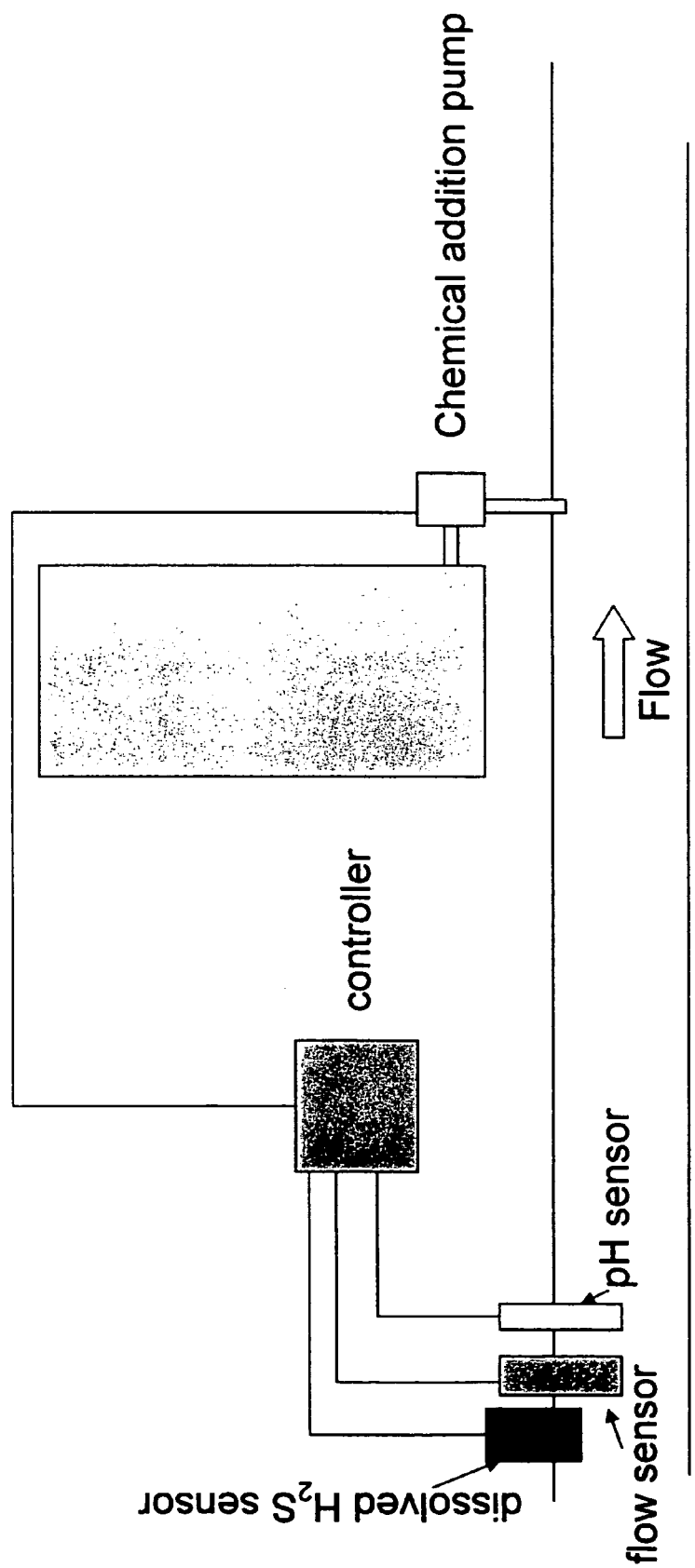
FIG. 6 is a schematic diagram of an on-line analyzer being used in an open loop to control chemical addition.

A closed loop control schematic is shown in FIG. 5, and an open loop control schematic is shown in FIG. 6. Closed loop is preferred because it requires fewer parameters to be monitored while providing real time information on sulfide levels in the treated stream. However, an open loop system may be suitable for certain applications.

Thus, it is seen that the present invention is adapted for use in a batch-type system. By measuring the concentration in parts per million of sulfide gas in the headspace and the temperature of the wastewater sample, the concentration of dissolved hydrogen sulfide can be calculated from Henry's constant at the sample temperature. From this, the concentration of dissolved hydrogen sulfide in the equilibrated sample can be determined. If the pH of the equilibrated sample is also measured, the dissolved sulfide concentration in the equilibrated sample may be obtained. By knowing the ratio of headspace volume to sample volume, the concentration of dissolved sulfides in the wastewater can be calculated.

The present invention is also adapted for use in an on-line system in which the level of hydrogen sulfide in the headspace is monitored. Because the variation of Henry's constant with temperature is not that large when the temperature varies by only a few degrees and the value of dissolved hydrogen sulfide in the wastewater after treatment is relatively low, the on-line system can be carried out without necessarily monitoring temperature. In this manner, the dosing pump can be controlled based on the hydrogen sulfide concentration in the headspace thereby requiring few parameters to be measured.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of determining chemical dosage required to reduce sulfide concentration in wastewater, said method comprising:
   providing a headspace apart from the wastewater;
   establishing equilibrium between sulfide gas in said headspace and sulfide gas in the wastewater including accelerating said equilibrium;
   measuring concentration of sulfide gas in said headspace;
   calculating dissolved hydrogen sulfide concentration in the wastewater as a function of the concentration of sulfide gas in said headspace; and
   determining chemical dosage required to reduce sulfide concentration in the wastewater as a function of the dissolved hydrogen sulfide concentration in the wastewater.

2. The method of claim 1 including sensing temperature of the wastewater and calculating dissolved hydrogen sulfide concentration in the wastewater as a function of the temperature of the wastewater.

3. The method of claim 2 including sensing the pH of the wastewater and calculating dissolved sulfide concentration in the wastewater as a function of the pH of the wastewater.

4. The method of claim 3 including providing a dispensing system and dispensing with said dispenser system an amount of a chemical additive that reduces sulfides in the wastewater.

5. The method of claim 4 including dispensing a chemical additive that is of the type used to control odor in wastewater.

6. The method of claim 4 including dispensing an acid.

7. The method of claim 4 including constructing a dose response curve from the dissolved sulfide concentration in the wastewater.

8. The method of claim 1 including supplying an inert gas to said headspace.

9. The method of claim 1 including supplying a gas containing oxygen to said headspace.

10. A method for determining chemical dosage required to reduce sulfide concentration in wastewater, said method comprising:
    providing a substantially sealable vessel, said vessel defining a sample space to hold a sample of wastewater and a headspace apart from the sample space;
    introducing a sample of wastewater to said sample space and establishing equilibrium between sulfide gas in said headspace and sulfide gas in said sample including accelerating said equilibrium;
    measuring concentration of sulfide gas in said headspace;
    sensing pH of the wastewater;
    calculating dissolved hydrogen sulfide concentration in the wastewater as a function of the concentration of sulfide gas in said headspace and the pH of the wastewater; and
    determining chemical dosage required to reduce sulfide concentration in the wastewater as a function of the dissolved hydrogen sulfide concentration in the wastewater.

11. The method of claim 10 including sensing temperature of the wastewater and calculating dissolved sulfide concentration in the wastewater as a function of the temperature of the wastewater.

12. The method of claim 10 wherein said accelerating equilibrium includes providing a wastewater agitation system and agitating wastewater in said sample space with said agitation system.

13. The method of claim 12 wherein said wastewater agitation system comprises at least one chosen from a mixer and a spray device.

14. The method of claim 10 including mixing the gas in said headspace.

15. A method for determining chemical dosage required to reduce sulfide concentration in wastewater, said method comprising:
    providing a substantially sealable vessel said vessel defining a sample space to hold a sample of wastewater and a headspace apart from the sample space;
    introducing a sample of wastewater to said sample space;
    measuring concentration of sulfide gas in said headspace;
    sensing pH of the wastewater;
    calculating dissolved hydrogen sulfide concentration in the wastewater as a function of the concentration of sulfide gas in said headspace and the pH of the wastewater and as a function of a ratio of the volume of said headspace to the volume of said sample space; and
    determining chemical dosage required to reduce sulfide concentration in the wastewater as a function of the dissolved hydrogen sulfide concentration in the wastewater.

16. The method of claim 15 including sensing temperature of the wastewater and calculating dissolved sulfide concentration in the wastewater as a function of the temperature of the wastewater.

17. The method of claim 15 wherein said accelerating equilibrium includes providing a wastewater agitation system and agitating wastewater in said sample space with said agitation system.

18. The method of claim 15 wherein said wastewater agitation system comprises at least one chosen from a mixer and a spray device.

19. The method of claim 15 including mixing the gas in said headspace.

20. The method of claim 15 including providing a dispenser and dispensing with said dispenser a chemical additive that reduces sulfide in wastewater.

21. The method of claim 20 including controlling said dispenser to dispense the dosage required to reduce sulfide concentration in the wastewater.

22. A method for controlling a dispenser to dispense an amount of a chemical additive to reduce hydrogen sulfide concentration in wastewater, said method comprising:
    providing a substantially sealable vessel, said vessel defining a sample space to hold a sample of wastewater and a headspace apart from the sample space;
    introducing a sample of wastewater to said sample space and establishing equilibrium between sulfide gas in said headspace and sulfide gas in the sample including accelerating said equilibrium;

measuring concentration of sulfide gas in said headspace and calculating dissolved hydrogen sulfide concentration in the wastewater as a function of the concentration of sulfide gas in the headspace;

providing a dispenser and dispensing with said dispenser a chemical additive that reduces sulfides in wastewater; and controlling said dispenser to dispense an amount of chemical additive in the wastewater as a function of the dissolved hydrogen sulfide concentration in the wastewater.

23. The method of claim 22 including dispensing a chemical additive that is of the type used to control odor in wastewater.

24. The method of claim 22 including drawing the sample of wastewater from a flowing stream of wastewater.

25. The method of claim 24 including dispensing the chemical additive upstream of where the sample is drawn, thereby providing a closed loop control of the dispensing.

26. The method of claim 24 including dispensing the chemical additive downstream where the sample is drawn, thereby providing an open loop control of the dispensing.

* * * * *